United States Patent [19]

Salve

[11] 4,120,611
[45] Oct. 17, 1978

[54] ELECTRONIC DEVICE FOR AUTOMATICALLY CONTROLLING THE LEVEL OF A LIQUID IN A VAT

[76] Inventor: Roger M. Salve, "Clos Monfort" 51 Rue Haute 51, B-1330 Rixensart, Belgium

[21] Appl. No.: 785,751

[22] Filed: Apr. 7, 1977

[51] Int. Cl.² .................. F04B 49/06; H01H 35/18
[52] U.S. Cl. .................................. 417/36; 307/118; 318/482; 417/44
[58] Field of Search ............... 417/36, 44, 46; 307/118; 137/392; 318/482

[56] References Cited

U.S. PATENT DOCUMENTS

| | | | |
|---|---|---|---|
| 1,346,898 | 7/1920 | Kingsbury | 417/36 X |
| 2,924,234 | 2/1960 | Wilson | 137/392 |
| 3,279,379 | 10/1966 | Klyce | 417/36 |
| 3,292,547 | 12/1966 | Ward | 417/7 |
| 3,477,460 | 11/1969 | Dotto | 137/392 |
| 3,502,899 | 3/1970 | Jones | 417/36 X |
| 3,509,825 | 5/1970 | Sorensen | 417/36 |
| 3,540,027 | 11/1970 | Rauth et al. | 417/36 X |
| 3,671,142 | 6/1972 | Calabrese | 417/36 |
| 3,800,205 | 3/1974 | Zalar | 417/36 X |

*Primary Examiner*—Carlton R. Croyle
*Assistant Examiner*—Edward Look
*Attorney, Agent, or Firm*—Young & Thompson

[57] ABSTRACT

A device is described which comprises in combination at least one resistor means placed at a determined level on the inner wall surface of the vat, said resistor means having a resistance which is variable in response to the presence or absence of the liquid at the level thereof; switching means responsive to a control signal for causing the feed pump means for the liquid to be stopped, and control means for producing the control signal for the switching means, said control means comprising impedance means which includes the resistance of the said at least one resistor means, whereby the said resistance being varied by the presence or absence of the liquid in the vat at the level thereof causes the control means to operate the switching means thereby to stop or restart the feed pump means.

3 Claims, 2 Drawing Figures

ELECTRONIC DEVICE FOR AUTOMATICALLY CONTROLLING THE LEVEL OF A LIQUID IN A VAT

The present invention relates to an electronic device for automatically controlling the level of a liquid in a vat fed with the liquid through pump means.

Up to now controlling the level of a liquid such as wine was done by complicated arrangements including e.g. floater means acting mechanically or electromechanically on the opening and closing devices which control the inlet and outlet of the liquid. Installation of these arrangements is complicated and breakdowns are frequent, with the liquid either overflowing when the vat is refilled, or the vat left dry when it is being emptied. The former causes waste, and in the latter instance the quality of the liquid may decrease gradually, as is notably the case for wine. In this field the filling and emptying of vats raises continual problems, and overflowing occurs frequently while filling, resulting in much loss of costly wine.

The invention is an electronic device, the installation of which is simple and easy to realize and which is absolutely safe in operation.

According to the invention there is provided a device comprising in combination: a first resistor means placed at a relatively higher level on the inner wall surface of the vat, said resistor means having a resistance which is variable in response to the presence or absence of the liquid at the position thereof; second resistor means placed at a relatively lower level on the inner wall surface of the vat, said resistor means having a resistance which is variable in response to the presence or absence of the liquid at the position thereof; first switching means responsive to a control signal for being switched from a first to a second state, the first state being effective to enable the operation of the feed pump means for the liquid, whereby the switching of said first switching means to its second state causes the feed pump means to be stopped; control means fed from an electric supply source for producing said control signal for the first switching means, said control means comprising impedance means which includes the resistance of either of said first and second resistor means, said control means further comprising second switching means responsive to an energizing signal for being switched from a first to a second state, said first state being effective for connection across the first resistor means and said second state being effective for connection across the second resistor means, the said energizing signal for the second switching means being produced in response to the first switching means being operated to its second state.

DESCRIPTION OF AN EMBODIMENT OF THE INVENTION

Figure 1:
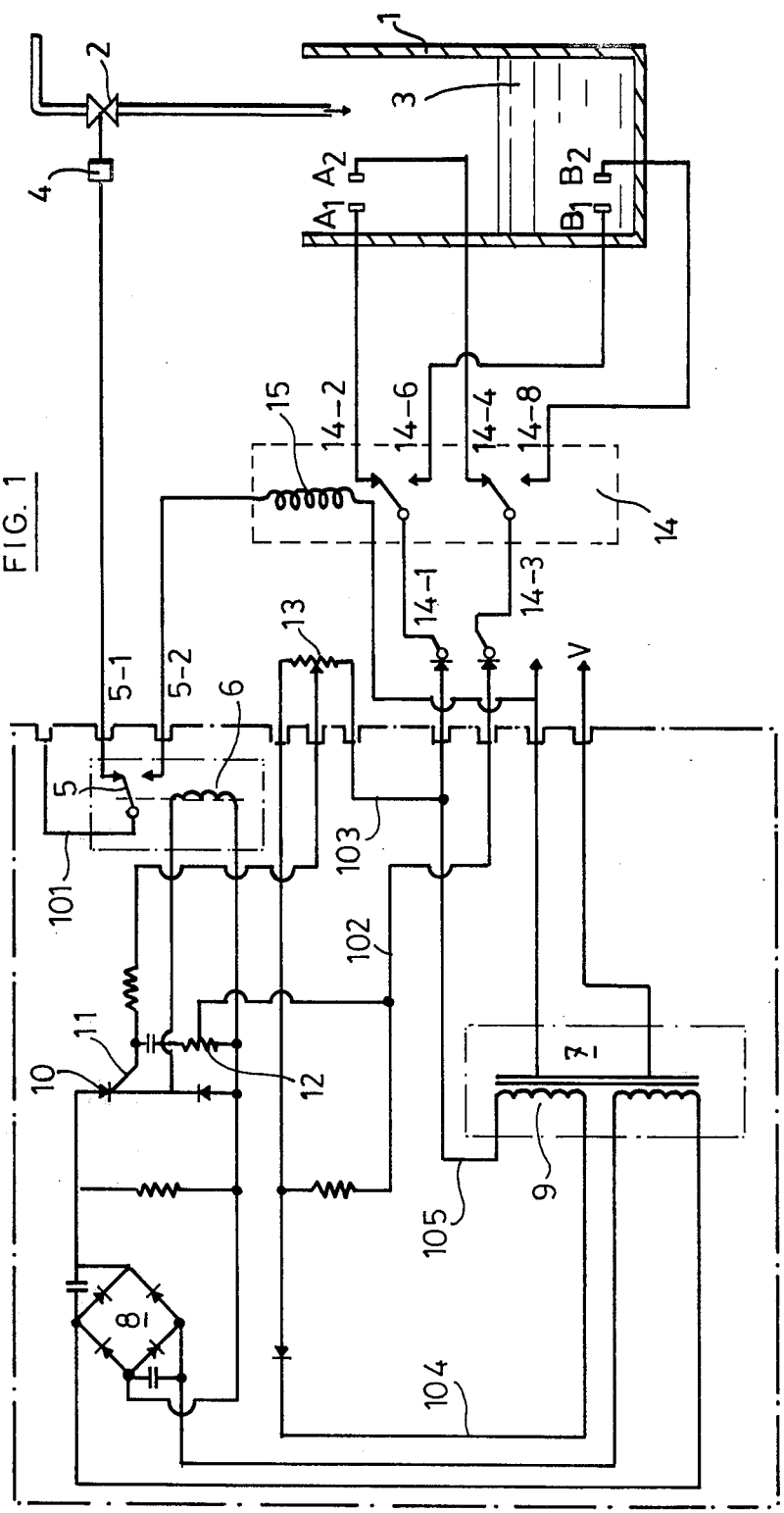
FIG. 1 is a schematic diagram of an exemplary arrangement according to the invention.

Referring to FIG. 1 there is shown schematically a vat 1 fed with a liquid through pump means represented at 2. The purpose of the control system of the invention is to control automatically the level of the liquid 3 contained in vat 1. It is assumed here that the liquid is electroconductive; that is, it contains even a minute quantity of water e.g. alcohol at 99°, wine, milk, beer, mineral water, lemonade, syrup, various acqueus solutions.

In this embodiment, the control device comprises two pairs of adjacent electrodes made of electroconducting material $A_1$, $A_2$ and $B_1$, $B_2$ which are placed on the inner wall of vat 1: one pair ($A_1$, $A_2$) at a relatively higher level of the vat, the other ($B_1$, $B_2$) at a relatively lower level. The electrodes of each of said pairs are spaced apart by a distance of few centimeters or so one from the other. Their size can be reduced to that of a nail head. The electrode pairs serve the purpose of variable resistor means responding to the presence or absence of the liquid at the position thereof. The basic idea of the invention is making the resistance presented by the liquid between two adjacent electrodes it wets intervene in the control circuit.

The pump means 2 is operated by a control device 4 the energizing circuit of which includes the break contact 5-1 of a single-pole double-throw switching means represented for instance by the electro-magnetic relay 5 in FIG. 1. The input terminal 5-0 of relay 5 is connected through line 101 to a supply source (not shown). The switching means 5 is a two-state switch device which operates in response to a control signal applied to its energizing winding means 6. The control signal for switching means 5 is produced by a control circuitry fed from the mains voltage V through supply transformer 7 and rectifier bridge 8. In the exemplary embodiment shown in the drawing the control circuitry comprises a controlling switch means consisting e.g. of a SCR 10, the gate electrode 11 of which has gating threshold voltage applied to it which is fixed by the tap on resistor 12. The gating of SCR 10 causes a control signal to be applied to the energizing winding means 6, thereby causing the relay 5 to be switched to its second state and thereby causing the pump means 2 to be stopped.

According to the invention the gating threshold voltage to gate 11 of SCR 10 is controlled by an impedance comprising adjustable resistor 13 and the resistance inserted between the adjacent electrodes of either pair of electrode means. As shown in FIG. 1 the gate electrode 11 of SCR 10 is connected to a tap on resistor 13 the terminals of which are connected by lines 102 and 103 to the input terminals of second controlled switching means 14 and by lines 104 and 105 to a supply voltage through the secondary winding 9 of supply transformer 7.

Switching means 14 may be any type of controlled double-pole double-throw switch arrangement e.g. a double-pole double-through relay contact arrangement as illustrated in FIG. 1. As shown, the switching means 14 has two pairs of output terminals 14-2, 14-4; 14-6, 14-8: the output terminals of the first pair are connected to the first pair of electrodes $A_1$ and $A_2$ respectively, the output terminals of the second pair are connected to the second pair of electrodes $B_1$ and $B_2$ respectively. Operation of switching means 14 is responsive to an energizing signal applied to its energizing winding 15 which is connectable across a voltage source through the operated make contact 5-2 of the first switching means 5 such that said first switching means 5 being operated causes in turn the second switching means 14 to operate. With switching means 14 released in state 1, the terminals of resistor 13 are connected to the first pair of electrodes $A_1$, $A_2$ as shown on FIG. 1. With switching means 14 operated in state 2, the terminals of resistors 13 are connected to the second pair of electrodes $B_1$, $B_2$.

In operation, when the vat 1 is empty, relays 5 and 14 are released in state 1 as shown on the drawing. The break contact 5-1 couples the supply current to the control means 4 for enabling the pump 2 to fill the vat. As liquid is fed into the vat, the level of the liquid 3 increases and as soon as the liquid reaches a level causing the electrodes $A_1$ and $A_2$ to be wet the low resistance inserted therebetween causes the voltage applied to the gate 11 of SCR 10 to increase above the gating threshold and SCR 10 is enabled, allowing a current to flow through the energizing coil 6 of relay 5. The latter then switches to state 2, and the operated break contact 5-1 breaks the energizing circuit for the pump control means 4 such that the pump 2 stops feeding the liquid into the vat.

Operation of relay 5 also operates make contact 5-2 for coupling supply current through the energizing coil 15 of relay 14 and the latter operates whereby the operated break contacts 14-2 and 14-4 disconnect the electrodes $A_1$ and $A_2$ from the control circuit while the operated make contacts 14-6 and 14-8 connect the electrodes $B_1$ and $B_2$ into the control circuit.

Now when the level of the liquid 3 in the vat discreases down to the level of lower electrode pair $B_1$ and $B_2$, the high resistance therebetween causes the level of the voltage applied to gate 11 of SCR 10 to decrease, and SCR 10 is disabled. With SCR 10 being non-conducting, energization of relay 5 ceases and relay 5 releases for allowing the control device 4 to restart the pump 2 for having the vat 1 refilled. Then when the liquid level reaches the electrode pair $A_1$ and $A_2$ again, the control cycle described above is repeated.

It is apparent that the control device of the invention does control the level of the liquid in the vat so as to avoid any overflowing, the liquid level never rising substantially higher than the level of electrode pair $A_1$, $A_2$ and also to prevent the vat being left dry, the liquid level never sinking substantially lower than the level of electrode pair $B_1$, $B_2$.

Also this control device permits it a controlled predetermined quantity of liquid to be exhausted automatically, said quantity of liquid being determined by the distance between the level of electrode pair $A_1$, $A_2$ and the level of electrode pair $B_1$, $B_2$.

Figure 2:
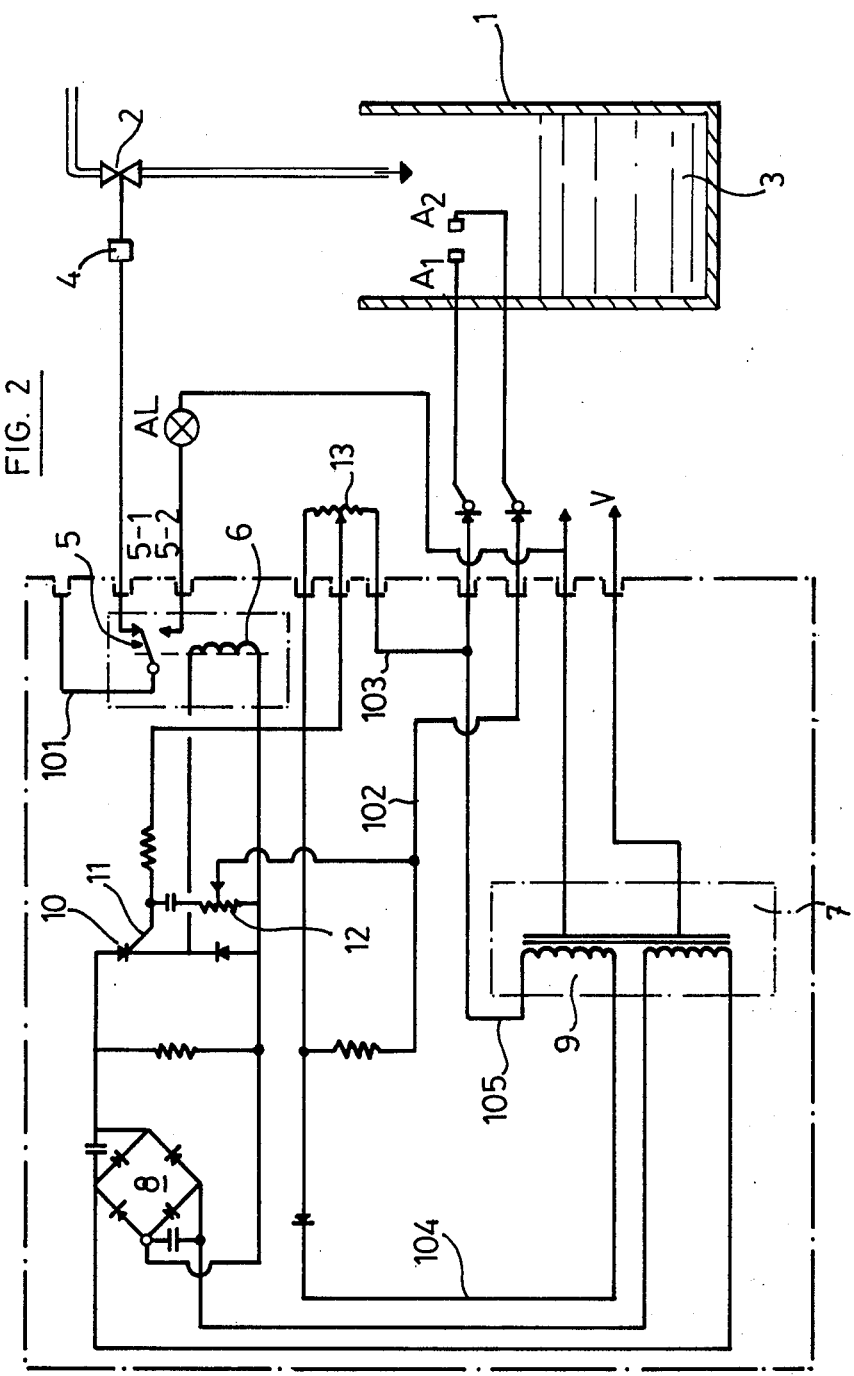
FIG. 2 is a schematic diagram of a simplified arrangement.

A simplified embodiment of the control device according to the invention is schemtically depicted in FIG. 2. In this figure the same references are used as in FIG. 1 for identifying same elements. The arrangement of FIG. 2 is similar to that of FIG. 1 except that switching means 14 is omitted together with one pair of electrode means $A_1$, $A_2$ only being provided on the inner wall of the vat 1. The operation is then the same as that one descirbed in the foregoing regarding the upper electrode pair in the arrangement of FIG. 1 thereby to cause the pump means 2 to be stopped in order to prevent any overflowing of liquid into the vat.

It will be apparent to one skilled in the art that a similar arrangement can be implemented with providing the lower electrode pair $B_1$, $B_2$ only, thereby to prevent the vat being left dry.

In the embodiment described in the foregoing, use is made of pairs of electrodes for serving the purpose of variable resistor means responding to the presence or absence of liquid at the positions thereof. This embodiment is suitable for controlling the level of electroconducting liquids.

For controlling the level of non-electroconducting liquids, the variable resistor means may comprise a theremistor means in place of each pair of electrode means, said thermistor means being heated at a temperature slightly higher than the temperature expected for the liquid to be fed into the vat. The presence and absence of the liquid at the level of said thermistor means is then detected by the resistance of the thermistor means being varied, this resistance variation intervening in the control circuit as described in the foregoing.

What is claimed is:

1. An electronic device for automatically controlling the level of a liquid in a vat fed with the liquid through pump means, said electronic device comprising in combination:
    (a) first resistor means placed at a relatively higher level on the inner wall surface of the vat, said resistor means having a resistance which is variable in response to the presence or absence of the liquid at the position thereof;
    (b) second resistor means placed at a relatively lower level on the inner wall surface of the vat, said resistor means having a resistance which is variable in response to the presence or absence of the liquid at the position thereof;
    (c) first switching means responsive to a control signal for being switched from a first to a second state, the first state being effective to enable the operation of the feed pump means for the liquid, whereby the switching of said first switching means to its second state causes the feed pump means to be stopped,
    (d) control means fed from an electric supply source for producing said control signal for the first switching means, said control means comprising impedance means which includes the resistance of either of said first and second resistor means, said control means further comprising second switching means responsive to an energizing signal for being switched from a first to a second state, said first state being effective for connection across the first resistor means and said second state being effective for connection across the second resistor means, the said energizing signal for the second switching means being produced in response to the first switching means being operated to its second state.

2. The device of claim 1 wherein the control means comprises serially connected third switching means having a control gate, said control gate being connected to an electric potential taken from a tap on resistor means having its terminals connected to said second switch means.

3. The device of claim 1 for automatically controlling the level of an electroconductive liquid in a vat fed with the liquid through pump means, said electronic device comprising in combination:
    (a) a first pair of electrode means made of electroconductive material, the electrode means of the pair being placed adjacent to each other at a relatively higher level on the inner wall surface of the vat,
    (b) a second pair of electrode means made of electroconductive material, the electrode means of the pair being placed adjacent to each other at a relatively lower level on the inner wall surface of the vat,
    (c) first switching means responsive to a control signal for being switched from a first to a second state, the first state being effective to enable the operation of the feed pump means for the liquid, whereby the switching of said first switching means to its second state causes the feed pump means to be stopped, (d) control means fed from an electric supply source for producing said control signal for the first switching means, said control means comprising impedance means which includes the resistance between the adjacent electrode means of either of said first and second pair of electrode means, said control means further comprising second switching means responsive to an energizing signal for being switched from a first to a second state, said first state being effective for connection to the electrode means of the first pair of electrode means and said second state being effective for connection to the electrode means of the second pair of electrode means, the said energizing signal for the second switching means being produced in response to the first switching means being operated to its second state.

* * * * *